US006801388B2

United States Patent
Kayama et al.

(10) Patent No.: US 6,801,388 B2
(45) Date of Patent: Oct. 5, 2004

(54) SPINDLE MOTOR AND DATA RECORDING/REPRODUCING APPARATUS WITH DYNAMIC-PRESSURE FLUID BEARING SUPPORTING SHAFT AND BALL BEARING SUPPORT ROTOR

(75) Inventors: Shun Kayama, Saitama (JP); Hidetoshi Shinozawa, Tokyo (JP)

(73) Assignees: Sony Corporation (JP); Nippon Keiki Works, Ltd. (JP)

( * ) Notice: Subject to any disclaimer, the term of this patent is extended or adjusted under 35 U.S.C. 154(b) by 269 days.

(21) Appl. No.: 10/059,215

(22) Filed: Jan. 31, 2002

(65) Prior Publication Data

US 2002/0122274 A1 Sep. 5, 2002

(30) Foreign Application Priority Data

Feb. 1, 2001 (JP) .................................. P2001-025804

(51) Int. Cl.[7] .............................................. G11B 17/02
(52) U.S. Cl. .................................................... 360/99.08
(58) Field of Search .......................... 360/99.08, 99.12, 360/97.01, 88; 720/695, 651; 369/270.1, 270, 269; 310/51

(56) References Cited

U.S. PATENT DOCUMENTS

| | | | | |
|---|---|---|---|---|
| 4,082,382 A | * | 4/1978 | Aromando | 384/492 |
| 4,701,651 A | * | 10/1987 | Tanaka | 310/90 |
| 4,772,965 A | * | 9/1988 | Kato et al. | 360/71 |
| 5,394,283 A | * | 2/1995 | Hans et al. | 360/98.07 |
| 5,412,522 A | * | 5/1995 | Lockhart et al. | 360/97.01 |
| 5,461,523 A | * | 10/1995 | Hoshi | 360/99.12 |
| 6,115,213 A | * | 9/2000 | Ikeda et al. | 360/99.08 |

FOREIGN PATENT DOCUMENTS

| | | | | |
|---|---|---|---|---|
| JP | 51-14105 A | * | 2/1976 | |
| JP | 2000-78792 A | * | 3/2000 | |

\* cited by examiner

*Primary Examiner*—Julie Anne Watko
(74) *Attorney, Agent, or Firm*—Rader, Fishman & Grauer PLLC; Ronald P. Kananen

(57) ABSTRACT

A spindle motor having a rotor R and a stator S. The stator S comprises a stator housing 80, a first bearing 82, a second bearing 84, a stator yoke 86, and a drive coil 88. The first bearing 82 is held in the stator housing 80 and supports a shaft 60, allowing the shaft 60 to rotate. The second bearing 84 provided between the stator housing 80 and a rotor housing 50, arranged concentric to the first bearing 82 in a radial direction, and supporting a rotor R, allowing the rotor R to rotate. The stator yoke 86 is formed integral with the stator housing 80, constituting a part of a housing 2 containing the rotor R and the stator S, and is made of magnetically permeable material. The drive coil 88 mounted on the stator yoke 86 and arranged in face-to-face relation with the drive magnet 58.

4 Claims, 20 Drawing Sheets

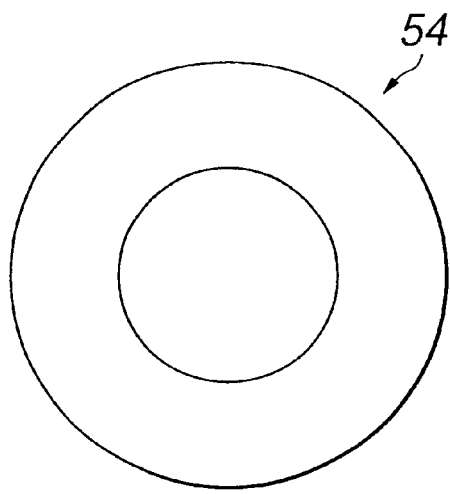 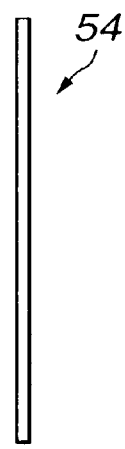
FIG.8A FIG.8B
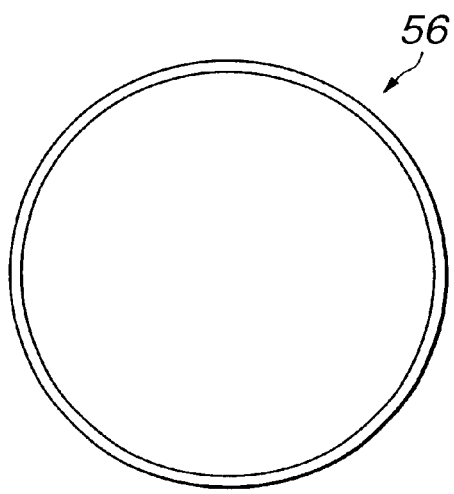 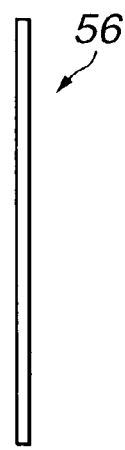
FIG.9A FIG.9B

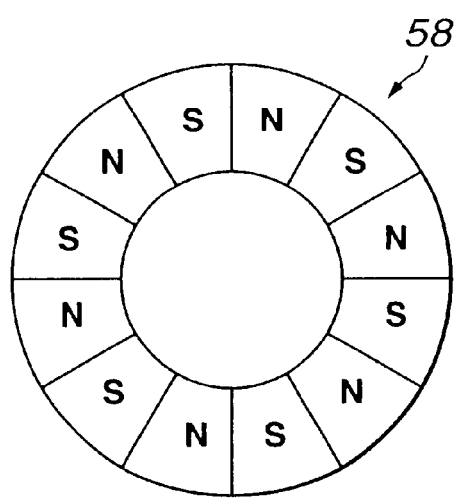 
FIG.10A        FIG.10B

FIG.15A  FIG.15B

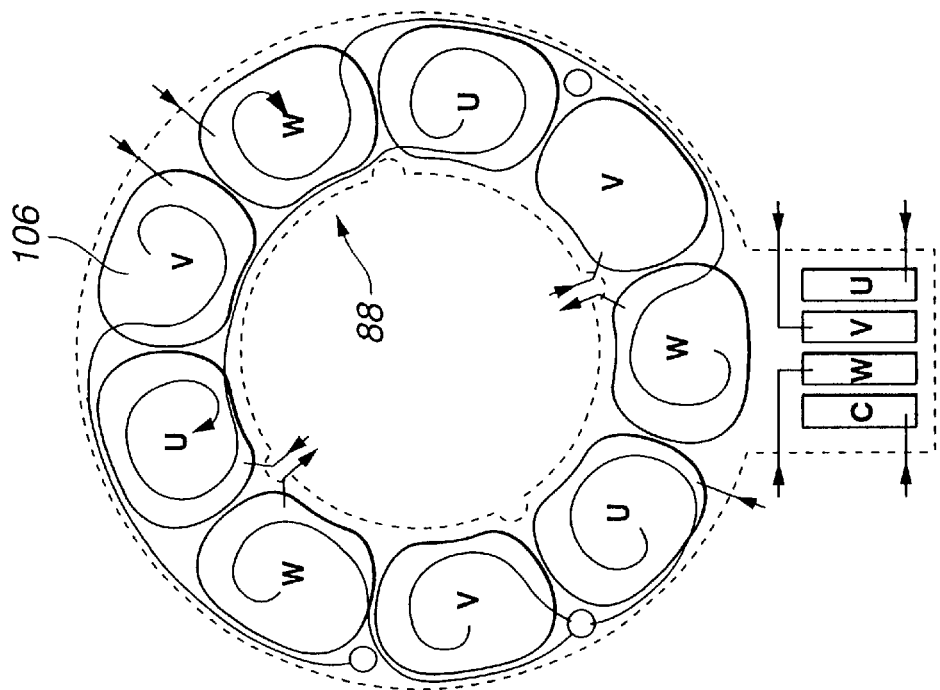
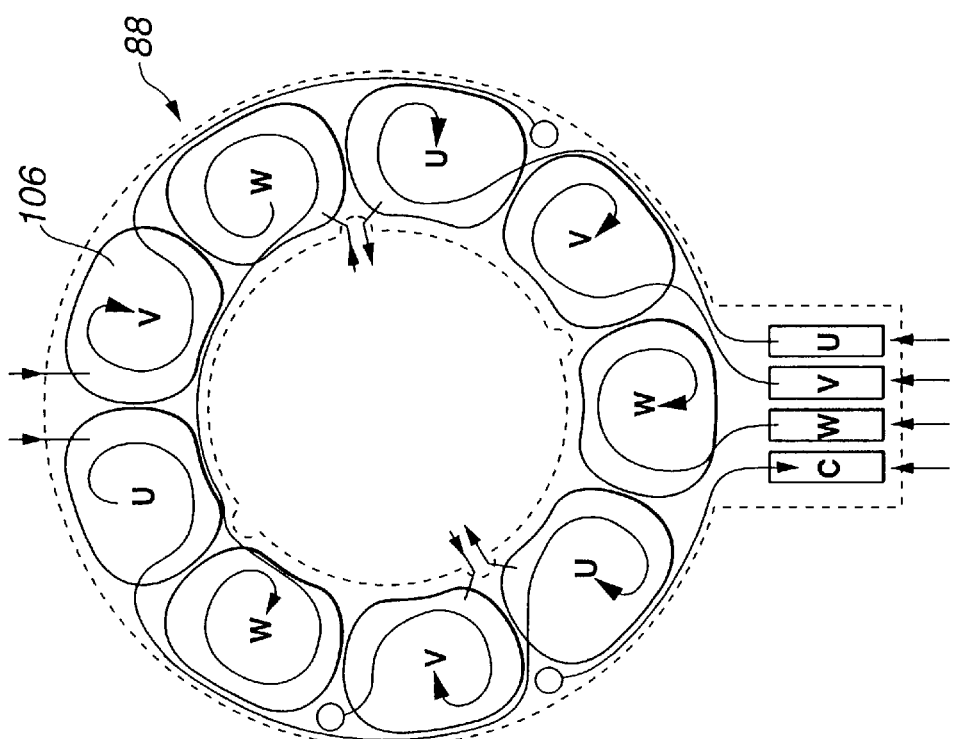
FIG. 19A
FIG. 19B

SPINDLE MOTOR AND DATA RECORDING/ REPRODUCING APPARATUS WITH DYNAMIC-PRESSURE FLUID BEARING SUPPORTING SHAFT AND BALL BEARING SUPPORT ROTOR

BACKGROUND OF THE INVENTION

1. Field of the Invention

The present invention relates to a spindle motor and a data recording/reproducing apparatus that has the spindle motor.

2. Description of the Related Art

Data recording/reproducing apparatuses, such as hard disc drives, find an expanding use. They are used in storage apparatus of large capacity and desktop personal computers. Further, they are incorporated in electronic apparatuses such as notebook personal computers and portable terminal devices.

Recently, hard disc drives of PC card type have come into use. A hard disc drive of this type has a so-called PC (Personal Computer) card size, or the same size as an IC (Integrated Circuit) memory card and a card-type modem. A user may insert the hard disc drive of PC card type into the PC card slot of his or her personal computer or portable terminal device and may use this hard disc drive, whenever necessary.

FIGS. 1 and 2 show two motors for use in conventional hard disc drives.

The motor shown in FIG. 1 comprises a rotor 1000 and a stator 1001. The rotor 1000 holds a disc-shaped recording medium D. The rotor 1000 is rotatably mounted on the shaft 1002 of the stator 1001 by means of two ball bearings 1003 and 1004.

In the motor shown in FIG. 2, the rotor 1010 holds a disc-shaped recording medium D and is rotatably mounted on the shaft 1012 of the stator 1011 by means of two ball bearings 1013 and 1014.

The motors of such structures as described above are disadvantageous in the following respects.

The motor of FIG. 1 cannot a small thickness E1 along the shaft, because the ball bearings 1003 and 1004 are arranged along the shaft 1002 (in the thrust direction). Similarly, the motor of FIG. 2 has a relatively large thickness E2 along the shaft, because the ball bearings 1013 and 1014 are arranged along the shaft 1012.

In both motors illustrated in FIGS. 1 and 2, the drive magnet 1020 surrounds the drive coil 1030. Besides, the coil 1030 is wound around a core.

It is therefore difficult to reduce the thickness E1 of the motor shown in FIG. 1 and the thickness E2 of the motor shown in FIG. 2. To make matters worse, either motor may not be sufficiently resistant to external impacts, because the two ball bearings are arranged in the thrust direction. When an impact is applied to the motor, data may not be reliably recorded or reproduced on and from the disc-shaped recording medium D.

BRIEF SUMMARY OF THE INVENTION

In view of the forgoing, an object of this invention is to provide a spindle motor that is thin, has a simple structure, excels in impact resistance and exhibits high operating reliability, and to provide a data recording/reproducing apparatus that has such a spindle motor.

A spindle motor having a rotor and a stator for rotating the rotor. The rotor comprises: a shaft; a rotor housing formed integral with the shaft and configured to hold an object to be rotated; a rotor yoke formed integral with the rotor housing and made of magnetically permeable material; and a drive magnet secured to the rotor yoke. The stator comprises: a stator housing; a first bearing held in the stator housing and supporting the first the shaft, allowing the shaft to rotate; a second bearing provided between the stator housing and the rotor housing, arranged concentric to the first bearing in a radial direction, and supporting the rotor, allowing the rotor to rotate; a stator yoke formed integral with the stator housing, constituting a part of a housing containing the rotor and the stator, and made of magnetically permeable material; and a drive coil mounted on the stator yoke and arranged in face-to-face relation with the drive magnet.

In the spindle motor, the rotor housing is formed integral with the shaft and configured to hold an object to be rotated. The rotor yoke is formed integral with the rotor housing and made of magnetically permeable material. The drive magnet is secured to the rotor yoke. The first bearing of the stator is held in the stator housing and supports the first the shaft, allowing the shaft to rotate. The second bearing is provided between the stator housing and the rotor housing, arranged concentric to the first bearing in a radial direction, and supports the rotor, allowing the rotor to rotate. The stator yoke is formed integral with the stator housing and constitutes a part of a housing that contains the rotor and the stator. The stator yoke is made of magnetically permeable material. The drive coil is mounted on the stator yoke and arranged in face-to-face relation with the drive magnet.

The second bearing is provided between the stator housing and the rotor housing, arranged concentric to the first bearing in a radial direction. That is, the first bearing and the second bearing are arranged in the radial direction. The spindle motor can therefore be thinner in the axial direction than in the case where two bearings are arranged in the thrust direction as in the conventional spindle motor.

The spindle motor can be still thinner, because the stator yoke is made of magnetically permeable material and constitutes a part of a housing that contains the rotor and the stator. Moreover, the drive coil is arranged in face-to-face relation with the drive magnet. This also helps to render the spindle motor thinner in the axial direction, than in the conventional spindle motor in which the drive coil faces the circumferential surface of the drive magnet.

Thus, the spindle motor can be very thin in the axial direction and very simple in structure.

As another feature of the spindle motor, the first bearing can be a sintered metal bearing, and the second bearing can be a ball bearing. Since the first bearing can be a sintered metal bearing, the spindle motor is excels in resistance to external impacts. In other words, only one ball bearing would be used, the motor would be more resistant to impacts than the conventional spindle motor that has two ball bearings.

As another feature of the spindle motor, the stator yoke can be a silicon steel plate or an iron plate, and the drive coil can be formed integral with an inner surface of the stator yoke. When the drive coil is formed integral with the inner surface of the stator yoke, the spindle motor can be thinner than otherwise.

In the spindle motor according to claim 4, which is a modification of the motor defined in claim 2, the sintered metal bearing is a dynamic-pressure fluid bearing.

A data recording/reproducing apparatus comprises a spindle motor having a rotor and a stator for rotating the rotor. The rotor comprises: a shaft; a rotor housing formed integral with the shaft and configured to hold a disc-shaped recording medium to be rotated; a rotor yoke formed integral with the rotor housing and made of magnetically permeable material; and a drive magnet secured to the rotor yoke. The stator comprises: a stator housing; a first bearing held in the stator housing and supporting the first the shaft, allowing the shaft to rotate; a second bearing provided between the stator housing and the rotor housing, arranged concentric to the first bearing in a radial direction, and supporting the rotor, allowing the rotor to rotate; a stator yoke formed integral with the stator housing, constituting a part of a housing containing the rotor and the stator, and made of magnetically permeable material; and a drive coil mounted on the stator yoke and arranged in face-to-face relation with the drive magnet.

In the apparatus, the rotor housing is formed integral with the shaft and configured to hold an object to be rotated. The rotor yoke is formed integral with the rotor housing and made of magnetically permeable material. The drive magnet is secured to the rotor yoke. The first bearing of the stator is held in the stator housing and supports the first the shaft, allowing the shaft to rotate. The second bearing is provided between the stator housing and the rotor housing, arranged concentric to the first bearing in a radial direction, and supports the rotor, allowing the rotor to rotate. The stator yoke is formed integral with the stator housing and constitutes a part of a housing that contains the rotor and the stator. The stator yoke is made of magnetically permeable material. The drive coil is mounted on the stator yoke and arranged in face-to-face relation with the drive magnet.

The second bearing is provided between the stator housing and the rotor housing, arranged concentric to the first bearing in a radial direction. That is, the first bearing and the second bearing are arranged in the radial direction. The spindle motor can therefore be thinner in the axial direction than in the case where two bearings are arranged in the thrust direction as in the conventional spindle motor.

The spindle motor can be still thinner, because the stator yoke is made of magnetically permeable material and constitutes a part of a housing that contains the rotor and the stator. Moreover, the drive coil is arranged in face-to-face relation with the drive magnet. This also helps to render the spindle motor thinner in the axial direction, than in the conventional spindle motor in which the drive coil faces the circumferential surface of the drive magnet.

The spindle motor can be very thin in the axial direction and very simple in structure.

As another feature of the data recording/reproducing apparatus, the first bearing can be a sintered metal bearing, and the second bearing is a ball bearing. Since the first bearing can be a sintered metal bearing, the spindle motor would excel in resistance to external impacts. In other words, only one ball bearing would be used, the motor would become more resistant to impacts than the conventional spindle motor that has two ball bearings.

As another feature of the data recording/reproducing apparatus, the stator yoke can be a silicon steel plate or an iron plate, and the drive coil can be formed integral with an inner surface of the stator yoke. Since the drive coil would be formed integral with the inner surface of the stator yoke, the spindle motor can be thinner than otherwise.

As another feature of the data recording/reproducing apparatus, the sintered metal bearing can be a dynamic-pressure fluid bearing. Since the sintered metal bearing can be a dynamic-pressure fluid bearing, it would reduce the probability that the shaft vibrates. The spindle motor can therefore be used to rotate the disc-shaped recording medium at high speeds, making but a little noise.

As described above, the present invention can provide a spindle motor that is thin, has a simple structure, excels in impact resistance and exhibits high operating reliability, and also a data recording/reproducing apparatus that has such a spindle motor.

BRIEF DESCRIPTION OF THE SEVERAL VIEWS OF THE DRAWING

FIGS. 8A and 8B are a plan view and a side view, each illustrating one rotor yoke incorporated in the spindle motor;

FIGS. 9A and 9B are a plan view and a side view, each illustrating another rotor yoke for use in the spindle motor;

FIGS. 10A and 10B are a plan view and a side view, respectively, showing the shape of the drive magnet incorporated in the spindle motor;

FIGS. 19A and 19B are diagrams illustrating the current-flow modes in the drive coil;

DETAILED DESCRIPTION OF THE INVENTION

Preferred embodiments of this invention will be described, with reference to the accompanying drawings.

The embodiments are preferred ones, each having various, desirable technical features that will be described below. Nonetheless, the present invention is not limited to the embodiments.

Figure 1:
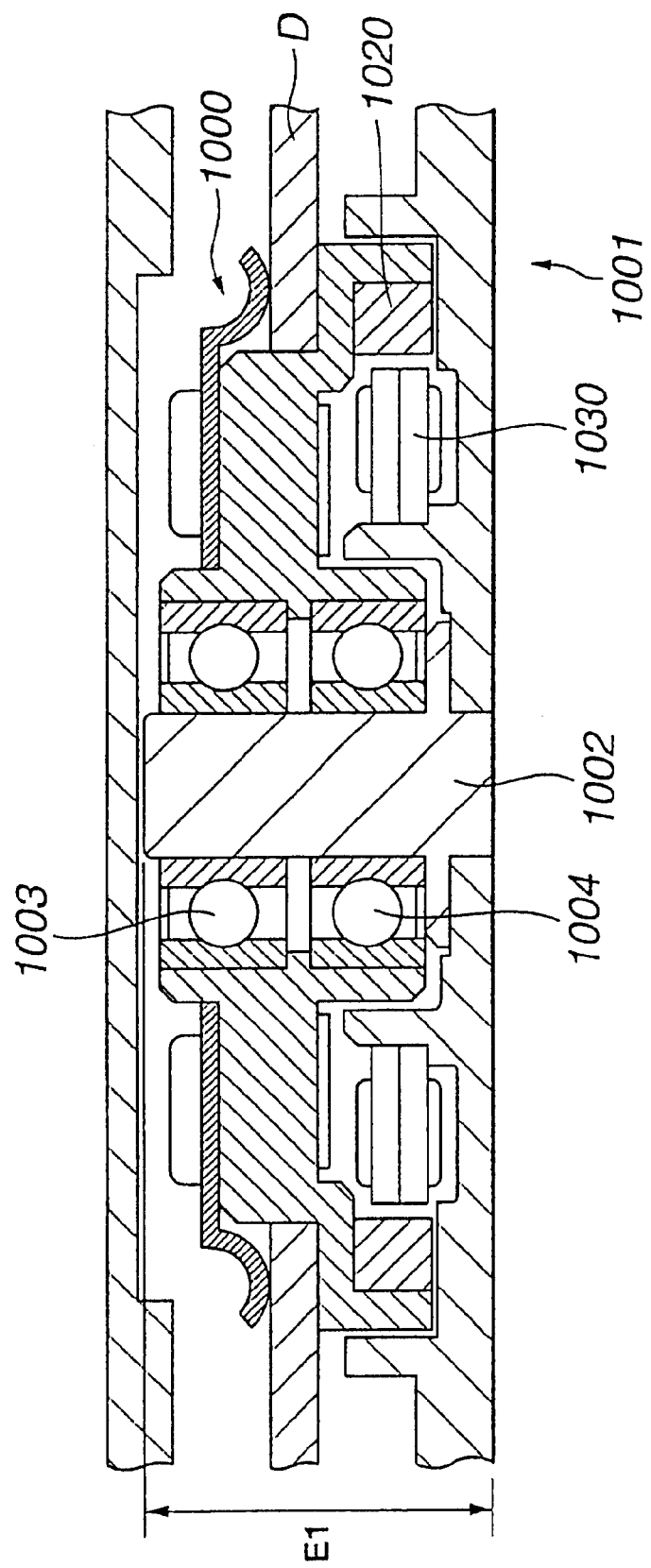
FIG. 1 is a sectional view of a conventional motor.
Figure 2:
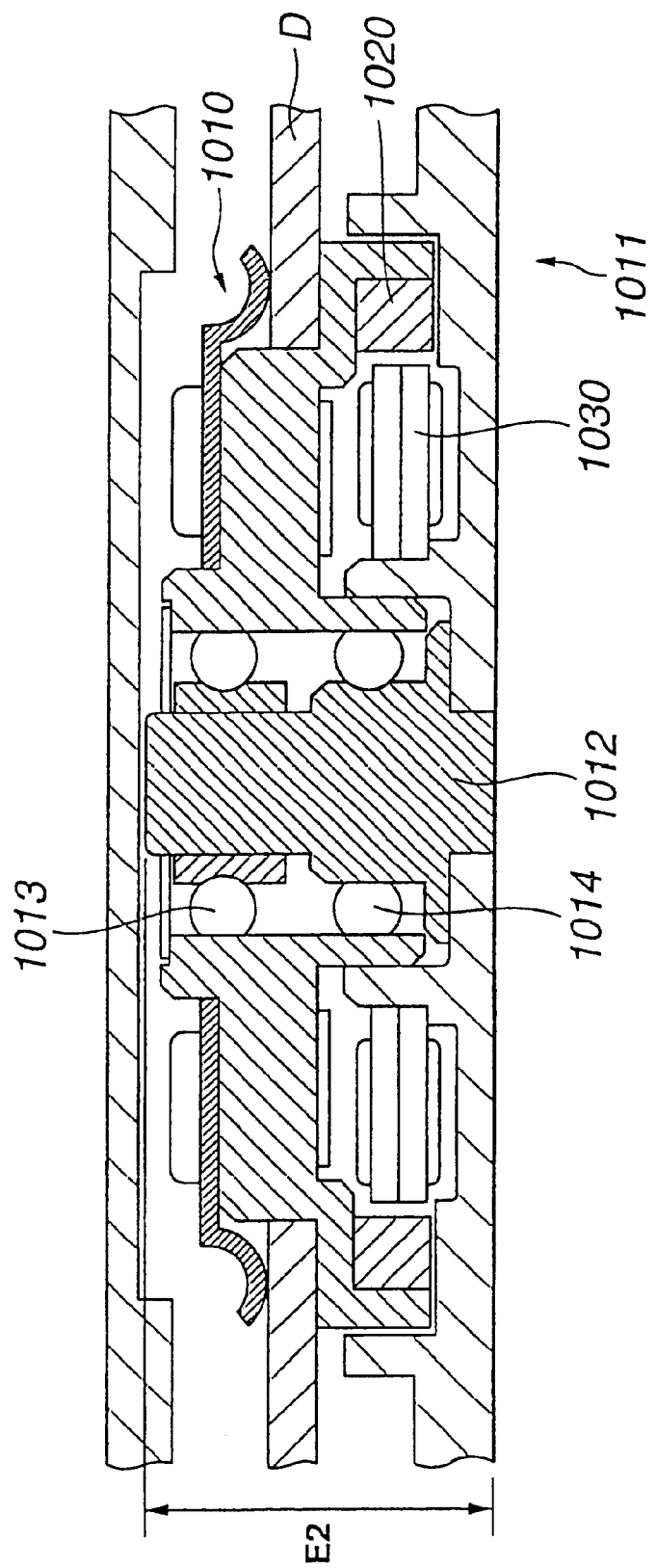
FIG. 2 is a sectional view of another conventional motor.
Figure 3:
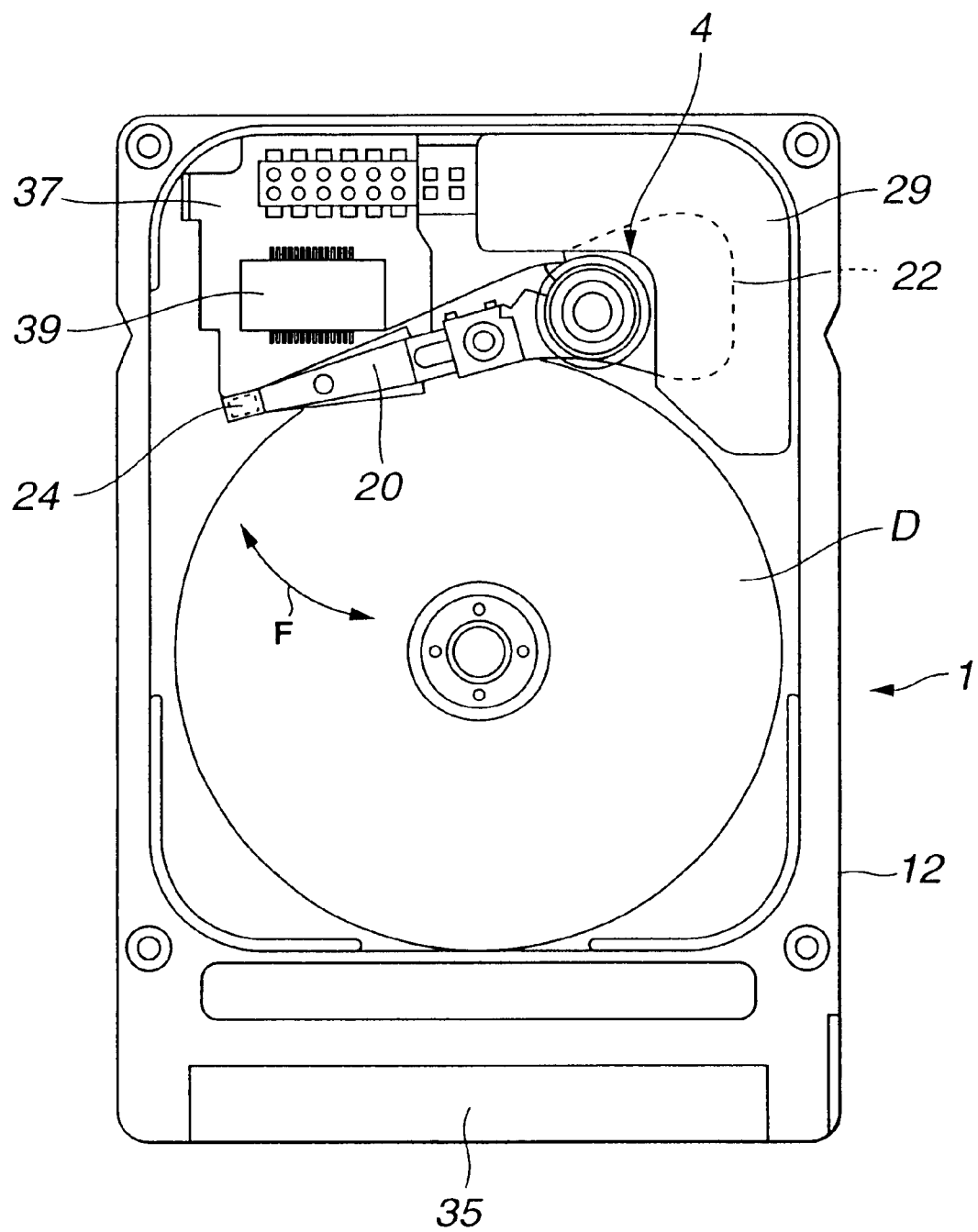
FIG. 3 is a plan view showing a hard disc drive that is a data recording/reproducing apparatus according to the present invention.
Figure 4:
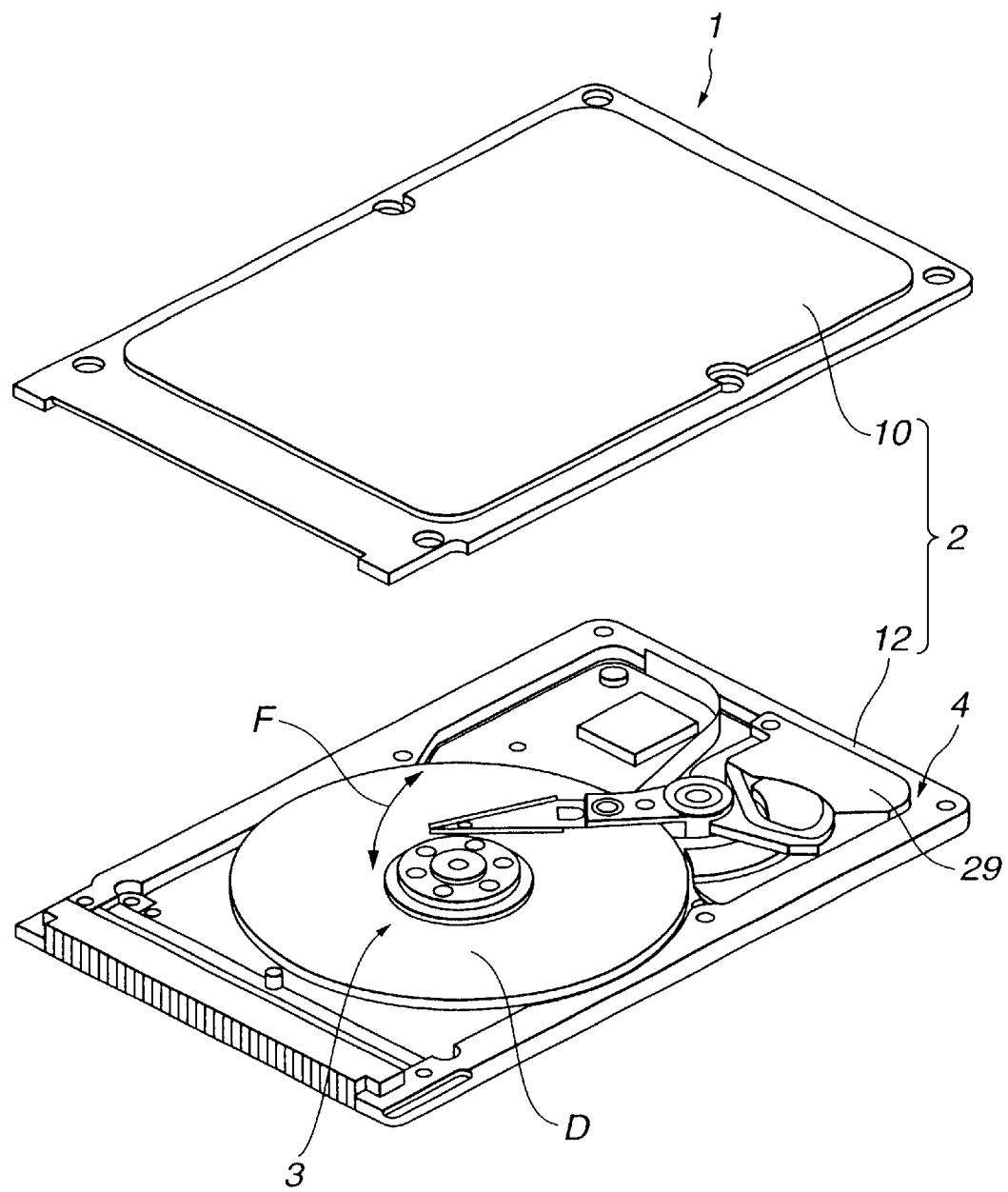
FIG. 4 is an exploded view of the hard disc drive shown in FIG. 3.
Figure 5:
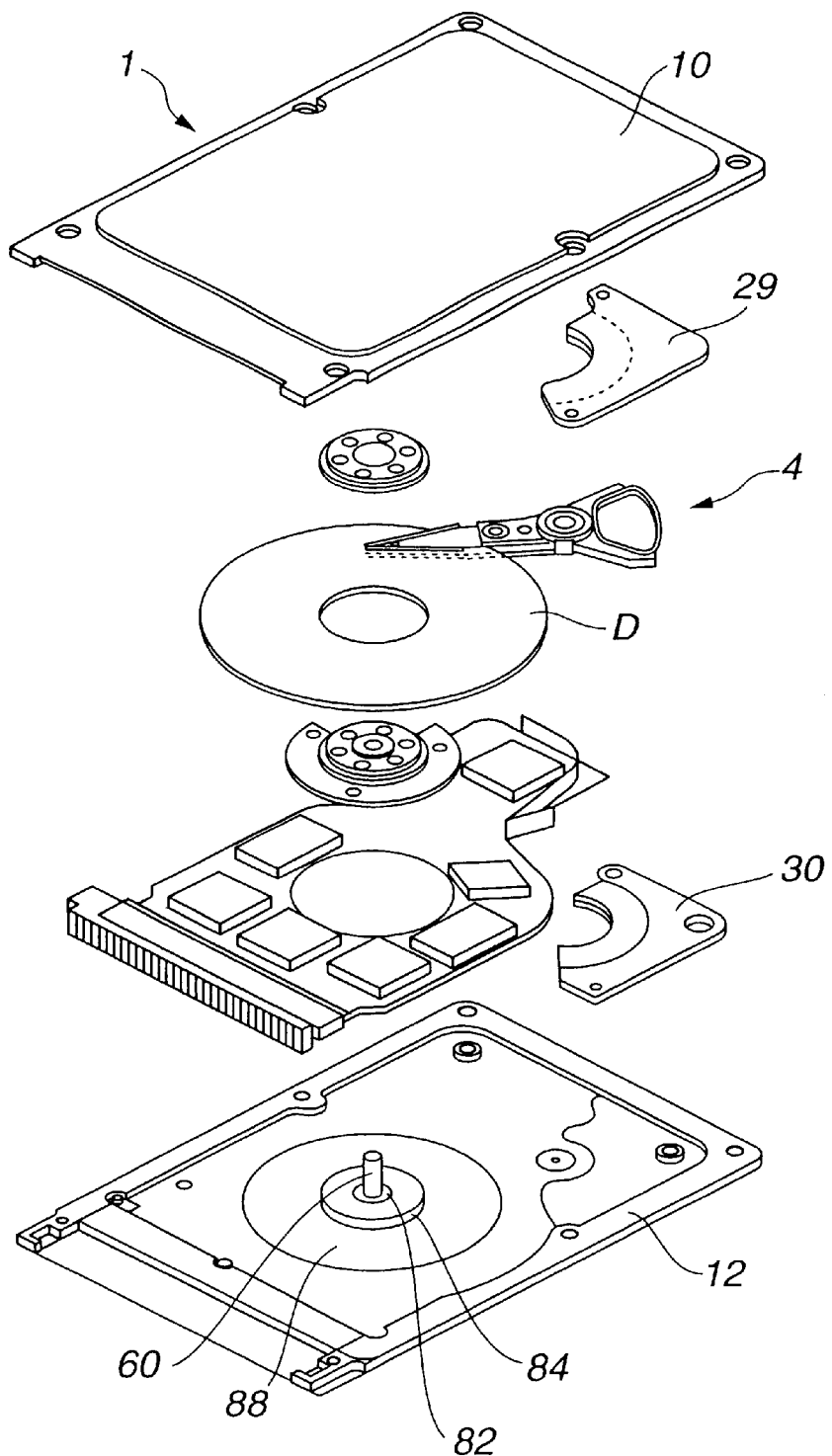
FIG. 5 is a more detailed exploded view of the hard disc drive.
Figure 6:
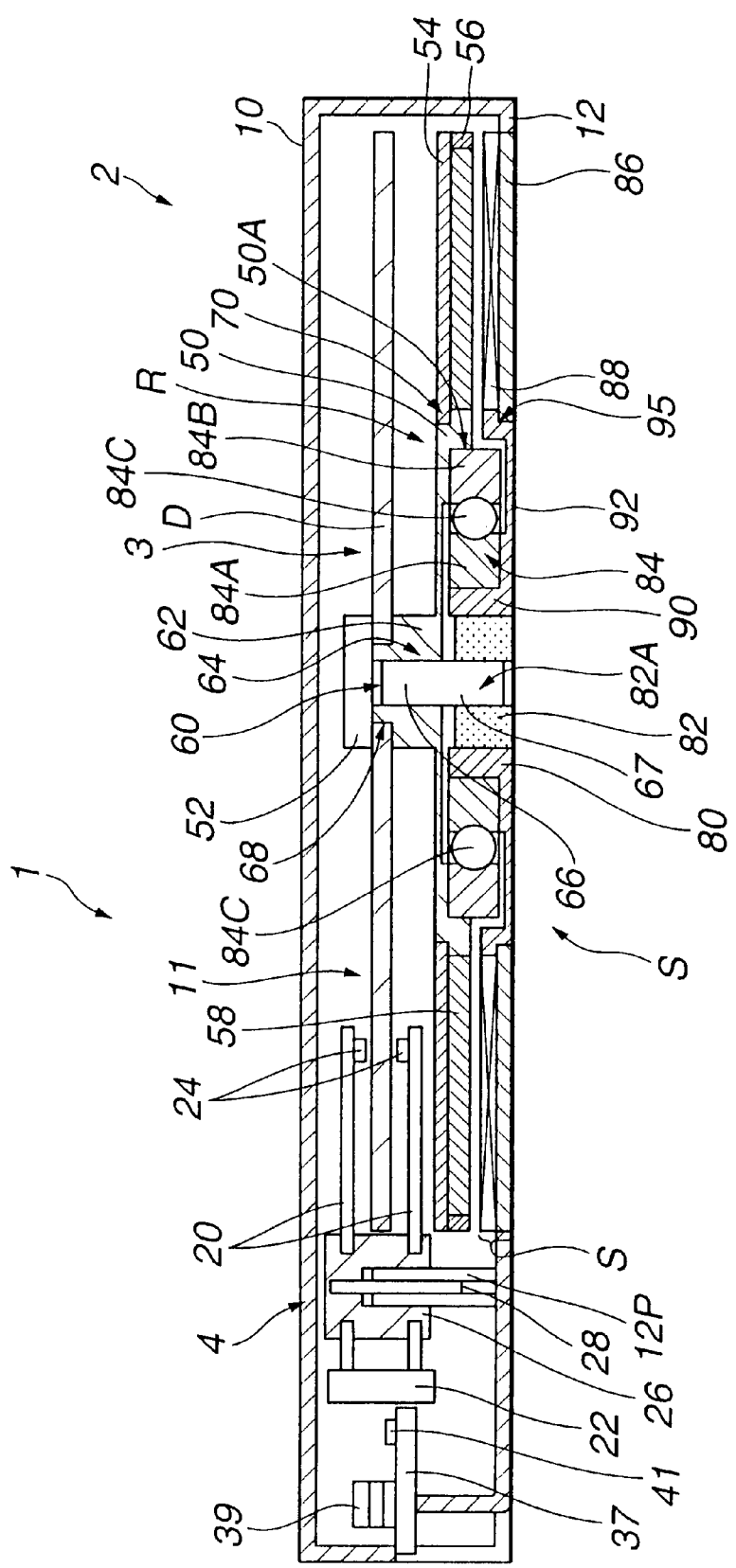
FIG. 6 is a sectional view of the hard disc drive, illustrating the structure of the spindle motor incorporated in the drive.

FIG. 3 is a plan view showing a data recording/reproducing apparatus according to this invention, which has a spindle motor. FIGS. 4 and 5 are exploded views of the data-recording/reproducing apparatus shown in FIG. 3. FIG. 6 is a sectional view of the data recording/reproducing apparatus shown in FIGS. 3 to 5.

More precisely, FIGS. 3 to 6 show a hard disc drive, which is an example of the data recording/reproducing apparatus. The hard disc drive 1 is configured to record data magnetically on a disc-shaped recording medium D and to reproduce data magnetically therefrom.

The hard disc drive 1 is designed for use in electronic apparatuses such as so-called "notebook-type" personal computers. The hard disc drive 1 may be inserted into a PC card slot of a notebook-type personal computer. It is a device very small and thin.

As FIGS. 4 and 5 show, the hard disc drive 1 comprises a housing 2, a disc-shaped recording medium D, a spindle motor 3, and two rotatable actuators 4. The housing 2 (also known as "outer housing") has a first half 10 and a second half 12 (also known as "upper housing" and "lower housing," respectively). As FIG. 6 shows, the first and second halves 10 and 12 are put together, defining a space 11. In the space 11 there are provided the spindle motor 3, the disc-shaped recording medium D, the rotatable actuators 4, and other components.

The first and second halves 10 and 12 are made of magnetically permeable material, constituting a magnetic circuit for the spindle motor 3. To be more specific, they are made of iron or silicon steel.

The disc-shaped recording medium D is secured to the rotor R of the spindle motor 3. The rotor R continuously rotates the disc-shaped recording medium D.

As FIGS. 3 and 6 show, each rotatable actuator 4 comprises a suspension 20, a voice coil 22, and two magnetic heads 24, as is illustrated in FIGS. 3 and 6. The suspension 20 has its proximal section 26 secured to a shaft 28. The shaft 28 is supported by a hollow cylinder 12P and can rotate. The cylinder 12P stands on the bottom of the second half 12 of the housing 2. An electromagnetic force is generated between the voice coil 22 (FIG. 6) and a magnet 29 or 30 (FIG. 5), to rotate the rotatable actuator 4. When the actuator 4 is rotated, the magnetic head 24 mounted on the distal end of the actuator 4 is moved in the direction of arrow F Shown in FIG. 3. The magnetic head 24 can therefore be positioned at a target track provided on the recording medium D that is rotating. The head 24 can therefore record data signals on the medium D and reproduce data from the medium D. The magnetic head 24 may comprise, for example, a GMR (Giant Magneto-Resistance) element.

Figure 13:
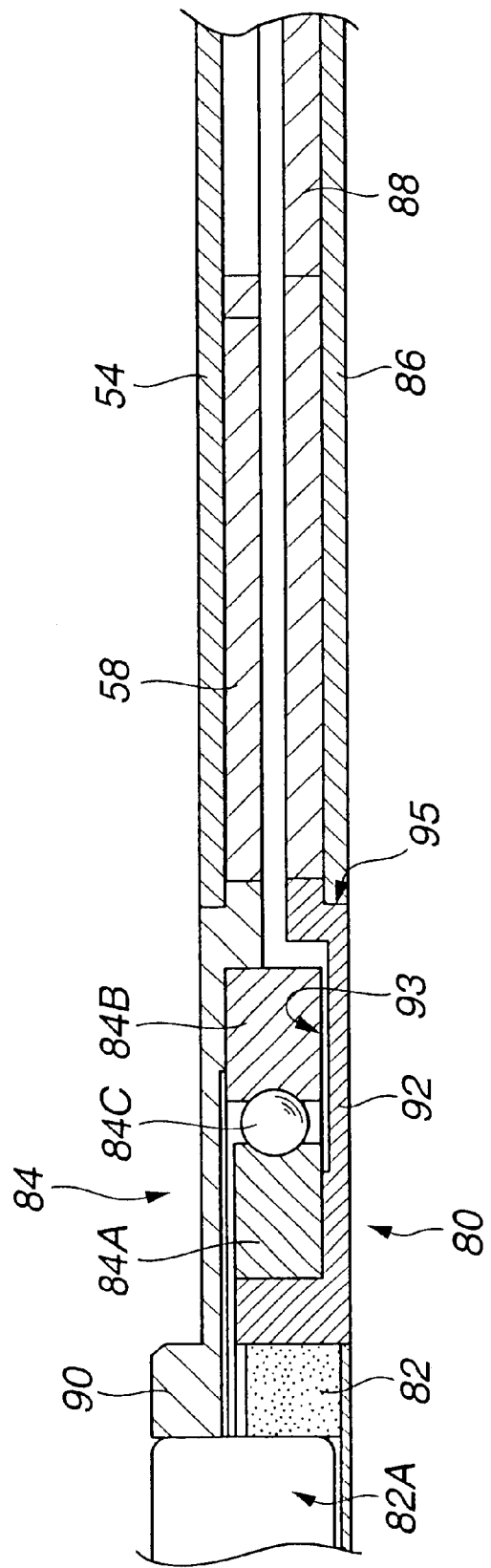
FIG. 13 is a sectional view illustrating the sintered metal bearing, ball bearing and some other components of the spindle motor.

FIG. 3 shows the hard disc drive 1, with the first half 10 (FIG. 6) disconnected from the second half 12. The disc-shaped recording medium D, the rotatable actuators 4 and some other components are therefore seen from outside. The second half 12 has connection terminals 35 at its one end. The connection terminals 35 can be electrically connected to a computer or the like. As FIGS. 6 and 13 show, a circuit board 37 is provided in the space 11 (FIG. 6) and located outside the disc-shaped recording medium D. A system LSI (Large Scale Integrated Circuit) 39 and electronic components 41 are mounted on the circuit board 37. The electronic components 41 include ICs (Integrated Circuits).

The structure of the spindle motor 3 shown in FIG. 6 will be described.

The spindle motor 3 has a rotor R and a stator S. The rotor R will be described first.

The rotor R comprises a rotor housing 50, a chuck 52, two rotor yokes 54 and 56, a drive magnet 58, and a rotor shaft 60.

The rotor housing 50 is made of, for example, stainless steel. A columnar projection 62 protrudes upwards from the center part of the rotor housing 50. The projection has a hole 64, in which one end portion 66 of the shaft 60 is press-fitted.

Since the shaft 60 has its one end portion 66 fitted in the hole of the projection 64, the centering of the rotor R is accomplished. The shaft 60 is made of, for example, stainless steel.

The chuck 52 is a disc that is made of, for example, stainless steel. The chuck 52 is a member that secures the disc-shaped recording medium D at the recess 68 of the projection 62. The chuck 52 is caulked to, bonded to, press-fitted in, or screw-fastened to the projection 62.

After the disc-shaped recording medium D is secured to the projection 62 of the rotor R, both rotatable actuators 4 may be rotated. The magnetic heads 24 on the suspensions 20, which oppose but do not contact the surfaces of the medium D, respectively, can record and reproduce data on and from the disc-shaped recording medium D.

Alternatively, the magnetic heads 24 may contact the surfaces of the medium D to record data on, and reproduce data from, the disc-shaped recording medium D.

Figure 7A:
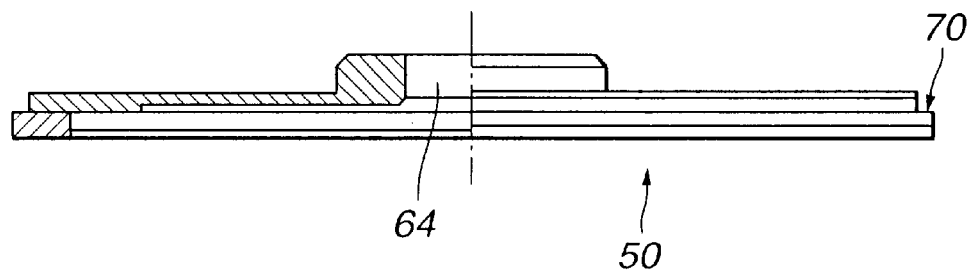
FIG. 7A is a partly sectional, side view of the rotor housing of the spindle motor.
Figure 7B:
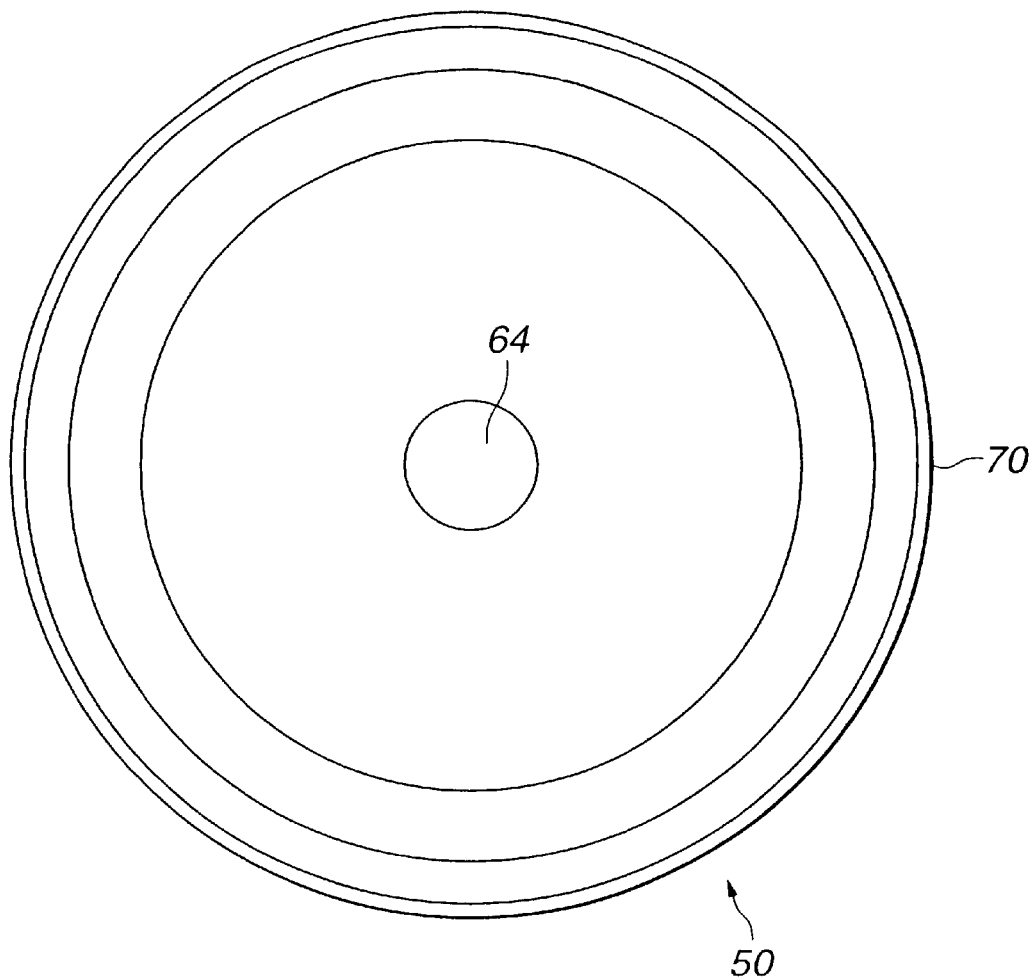
FIG. 7B is a plan view of the rotor housing of the spindle motor.

FIGS. 7A and 7B illustrate the rotor housing 50. The rotor housing 50 has a stepped part 70 on its circumferential surface. The rotor housing 50 is made of, for example, stainless steel.

The rotor yoke 54 shown in FIG. 6 and FIGS. 8A and 8B is secured to the stepped part 70, by means of press fitting, bonding, caulking or the like. The yoke 54 is thereby formed integral with the rotor housing 50. The rotor yoke 54 and the rotor yoke 56, which will be described later, are made of magnetically permeable material such as iron or silicon steel. The rotor yoke 54 covers one surface of the drive magnet 58. The other rotor yoke 56 surrounds the outer circumferential surface of the drive magnet 58.

FIGS. 8A and 8B show the rotor yoke 54, and FIGS. 9A and 9B depict the rotor yoke 56. The rotor yoke 56 is ring-shaped and fastened to the lower-surface, circumferential edge of the rotor yoke 54, by means of bonding, caulking or the like.

The rotor yokes 54 and 56 constitute a magnetic path (magnetic circuit) of the drive magnet 58.

The drive magnet 58 will be described with reference to FIGS. 10A and 10B. As FIGS. 10A and 10B show, the drive magnet 58 is ring-shaped and is very thin. The drive magnet 58 may be, for example, a rubber magnet. The drive magnet 58 has been magnetized, providing many poles. More precisely, it is composed of S poles and N poles that are alternately arranged as is illustrated in FIG. 10A. As seen from FIG. 6, the drive magnet 58 is bonded to the lower surface of the rotor yoke 54, by using, for example, an adhesive. The inner circumferential surface of the magnet 58 contacts the outer circumferential surface of the rotor housing 50.

Having the structure specified above, the rotor R can be very thin in its axial direction.

The stator S will be described with reference to FIG. 6. The stator S has a stator housing 80, a sintered metal bearing 82 (or first bearing), a ball bearing 84 (or second bearing), a stator yoke 86, a drive coil 88, and the like.

Figure 11A:
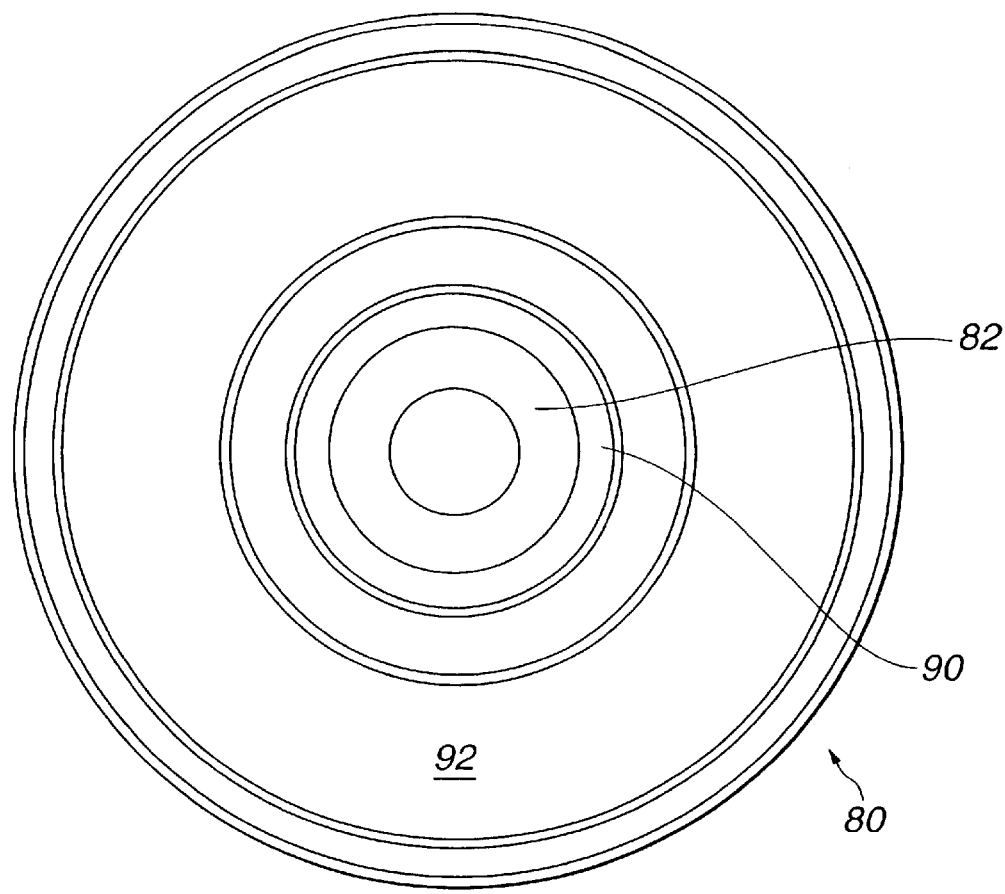
FIGS. 11A and 11B are a plan view and a side view, depicting the shape of the stator housing of the spindle motor.
Figure 11B:
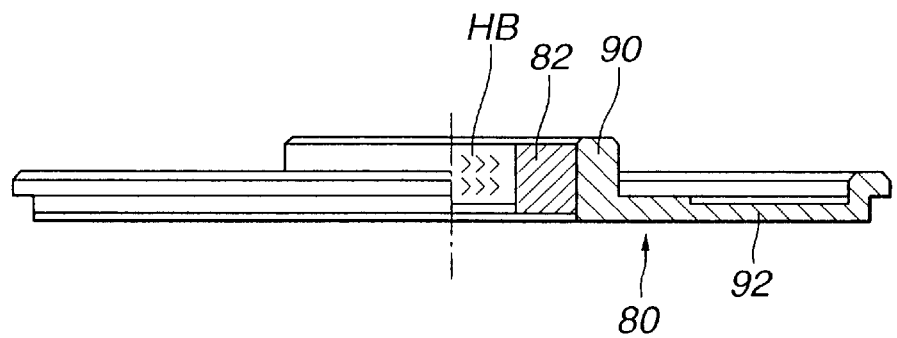

The stator housing 80 is a disc-shaped member, as seen from FIGS. 11A and 11B. It is made of a workable metal such as brass. As FIG. 6 and FIG. 11B show, the stator housing 80 has a hollow cylindrical part 90 and a thin ring-shaped part 92. The hollow cylindrical part 90 holds the sintered metal bearing 82, by means of, for example, press fitting. The sintered metal bearing 82 is immovably in the hollow cylindrical part 90. The ball bearing 84 has its inner face 84A immovably mounted on the outer circumferential surface 90T of the hollow cylindrical part 90. The outer race 84B of the ball bearing 84 is press-fitted in the rotor housing 50, contacting the inner circumferential surface 50A of the rotor housing 50. A plurality of balls 84C are arranged between the inner race 84A and the outer race 84B.

The sintered metal bearing 82 is made of porous metal material such as iron-copper material, iron-based material, copper-based material or the like. The sintered metal bearing 82 is impregnated with oil such as machine oil.

The other end portion of the shaft 60 is rotatably held in the sintered metal bearing 82, contacting the inner circumferential surface 82A of the bearing 82. The sintered metal bearing 82 may have herringbone grooves in the inner circumferential surface. Alternatively, the other end of the shaft 60 may have grooves HB cut in its outer circumferential surface. In either case, the sintered metal bearing 82 acts as a dynamic-pressure fluid bearing. Acting as such, the bearing 82 prevents the shaft 60 from vibrating.

Therefore, the shaft 60 can rotate smoothly at high speeds, and the spindle motor 3 makes little noise when the shaft 60 rotates at high speeds.

As FIG. 6 shows, the sintered metal bearing 82 and the ball bearing 84 are concentric to each other and coaxial with the shaft 60. That is, the sintered metal bearing 82 and the ball bearing 84 are arranged around the shaft 60, the latter positioned outside the former with respect to the radial direction of the spindle motor 3.

The sintered metal bearing 82 and the ball bearing 84 are arranged in almost the same plane and in the radial direction of the motor 3, whereas in the conventional spindle motor, two ball bearings are arranged in the axial direction (the thrust direction). Hence, the stator S and the neighboring other components can be thinner in the axial direction of the spindle motor 3.

As described above, the shaft 60 of the rotor R is press-fitted in the hole 64 of the projection 62. This structural feature and the fact that both bearings 82 and 84 are arranged in the radial direction prevent the rotor R from vibrating in a plane. To be more specific, the sintered metal bearing 82 prevents the rotor R from so vibrating, in spite of the clearance inevitably existing in the ball bearing 84.

Figure 12:
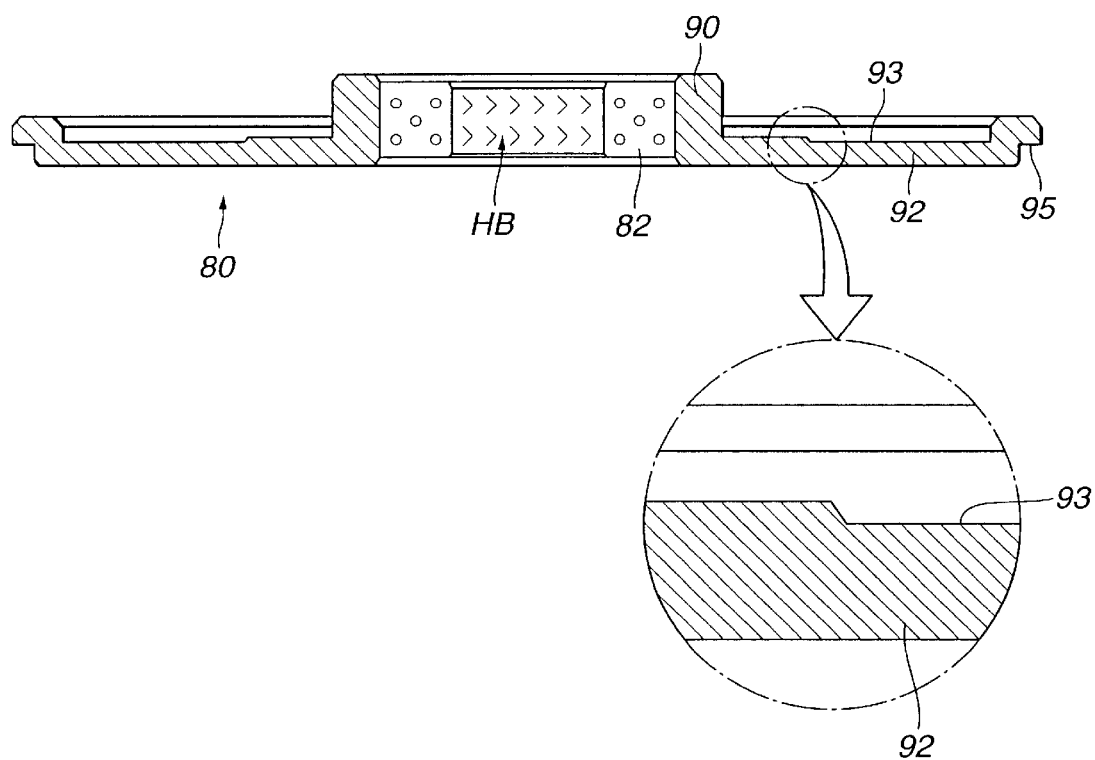
FIG. 12 is a sectional view showing the stator housing and the sintered metal bearing.

FIG. 12 shows the stator housing 80 shown in FIG. 6 and the sintered metal bearing 82 fitted and fixed in the stator housing 80. The ring-shaped part 92 of the stator housing 80 has a recess 93 that is cut in the inner surface. The recess 93 is an annular one, extending along the circumference of the stator housing 80. The recess 93 is provided to prevent the outer race 84B of the ball bearing 84 shown in FIG. 6 from abutting on the stator housing 80 while the outer race 84B is rotating together with the rotor R. The ring-shaped part 92 has a stepped part 95 on its circumferential surface. The sintered metal bearing 82 is a dynamic-pressure fluid bearing that has herringbone grooves HB in its inner circumferential surface as is illustrated in FIGS. 11A and 12. The bearing 82 can therefore reduce the probability that the shaft 60 vibrates. The spindle motor 3 can therefore be used to rotate the disc-shaped recording medium D at high speeds, making but a little noise.

Figure 14:
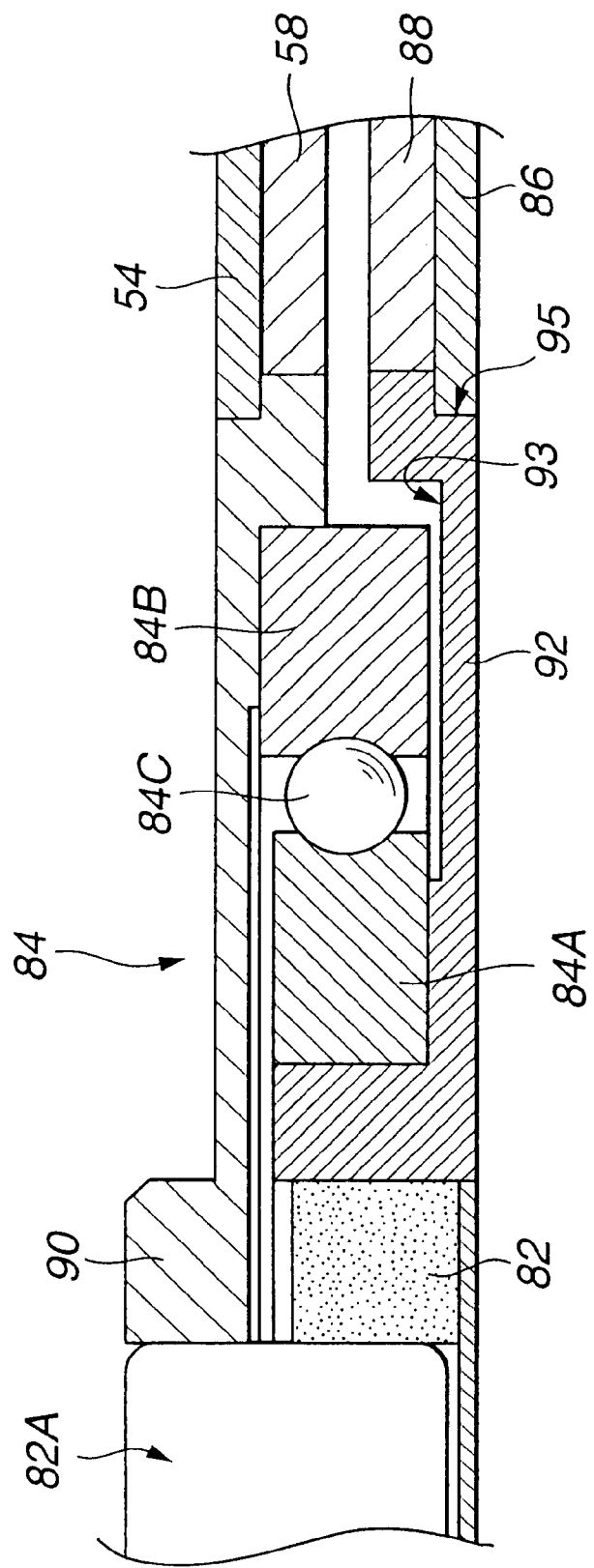
FIG. 14 is a magnified view of a part of FIG. 13.

FIG. 13 is a sectional view illustrating the stator housing 80, the stator yoke 86, the drive coil 88, the drive magnet 58, the rotor yoke 54 and the like. FIG. 14 is a magnified view of a part of FIG. 13, showing mainly the sintered metal bearing 82 and the ball bearing 84.

The stator yoke 86 shown in FIG. 6 is made of magnetically permeable material such as iron or silicon steel. The stator yoke 86 is a part of the second half 12 of the housing 2. The drive coil 88 is formed on the inner surface of the stator yoke 86. The stator yoke 86 is secured, at its inner surface, to the stepped part 95 of the ring-shaped part 92 of the stator housing 80, by means of press fitting, caulking, bonding or the like.

Figure 15:
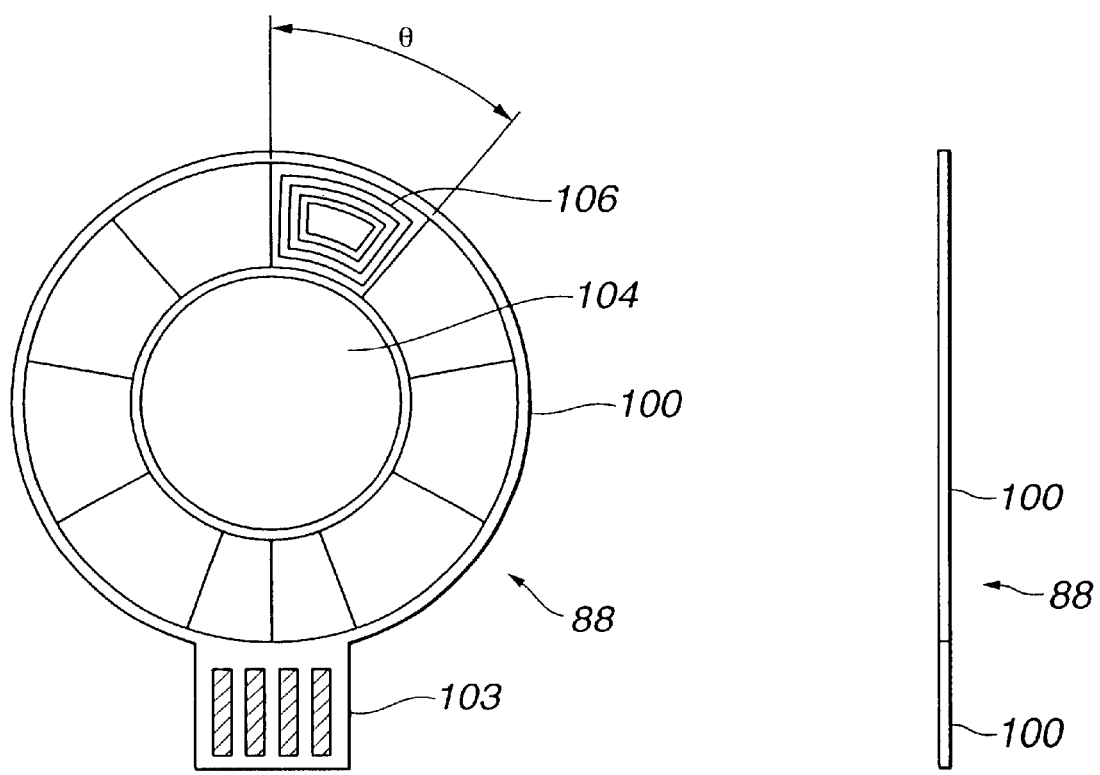
FIGS. 15A and 15B are a plan view and a side view, showing the stator coil of the spindle motor.

The drive coil 88 is shaped as will be described with reference to FIGS. 15A and 15B, FIG. 16 and FIG. 17. As FIGS. 15A and 15B show, the drive coil 88 is a thin circular one generally known as a "laminate coil."

Figure 16:
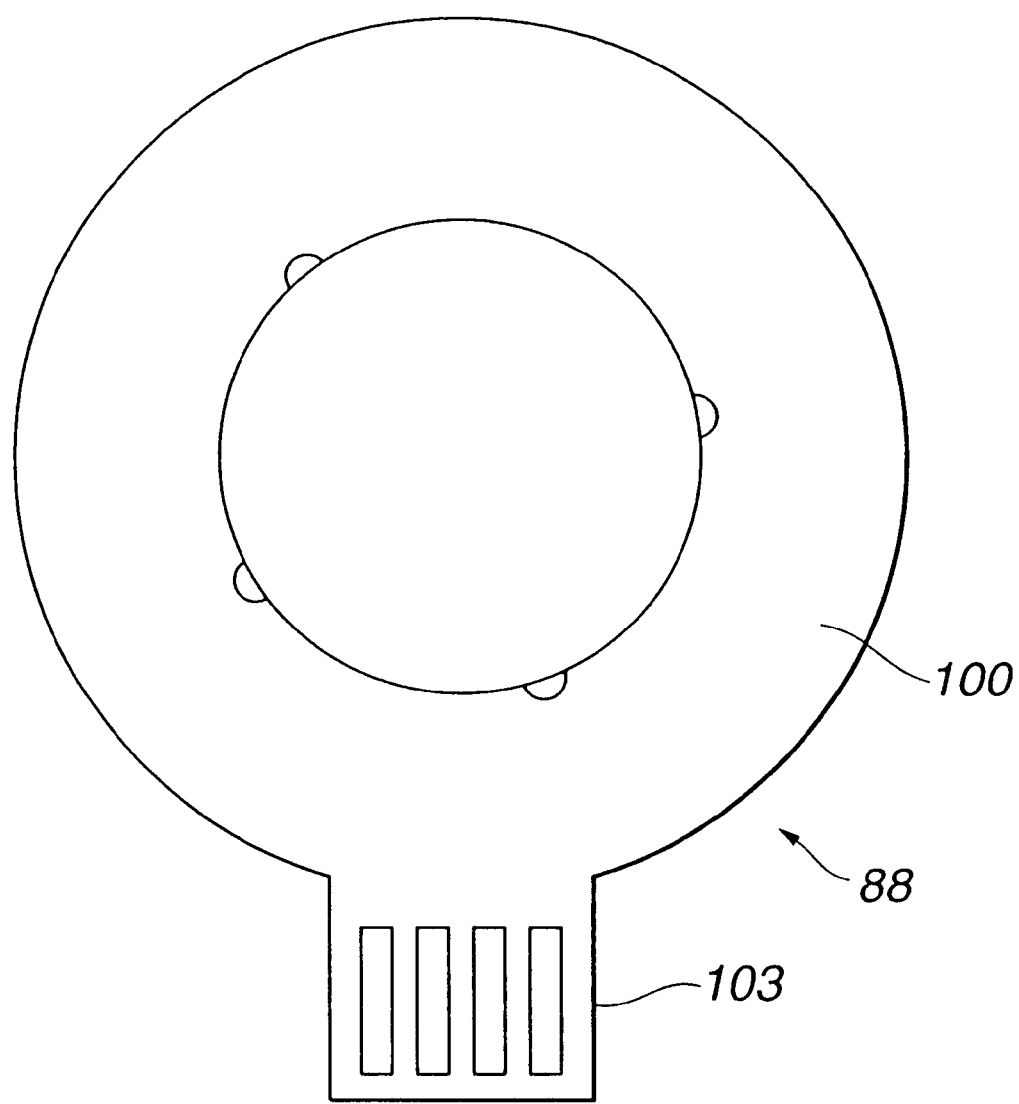
FIG. 16 is a plan view showing a part of the stator coil.
Figure 17:
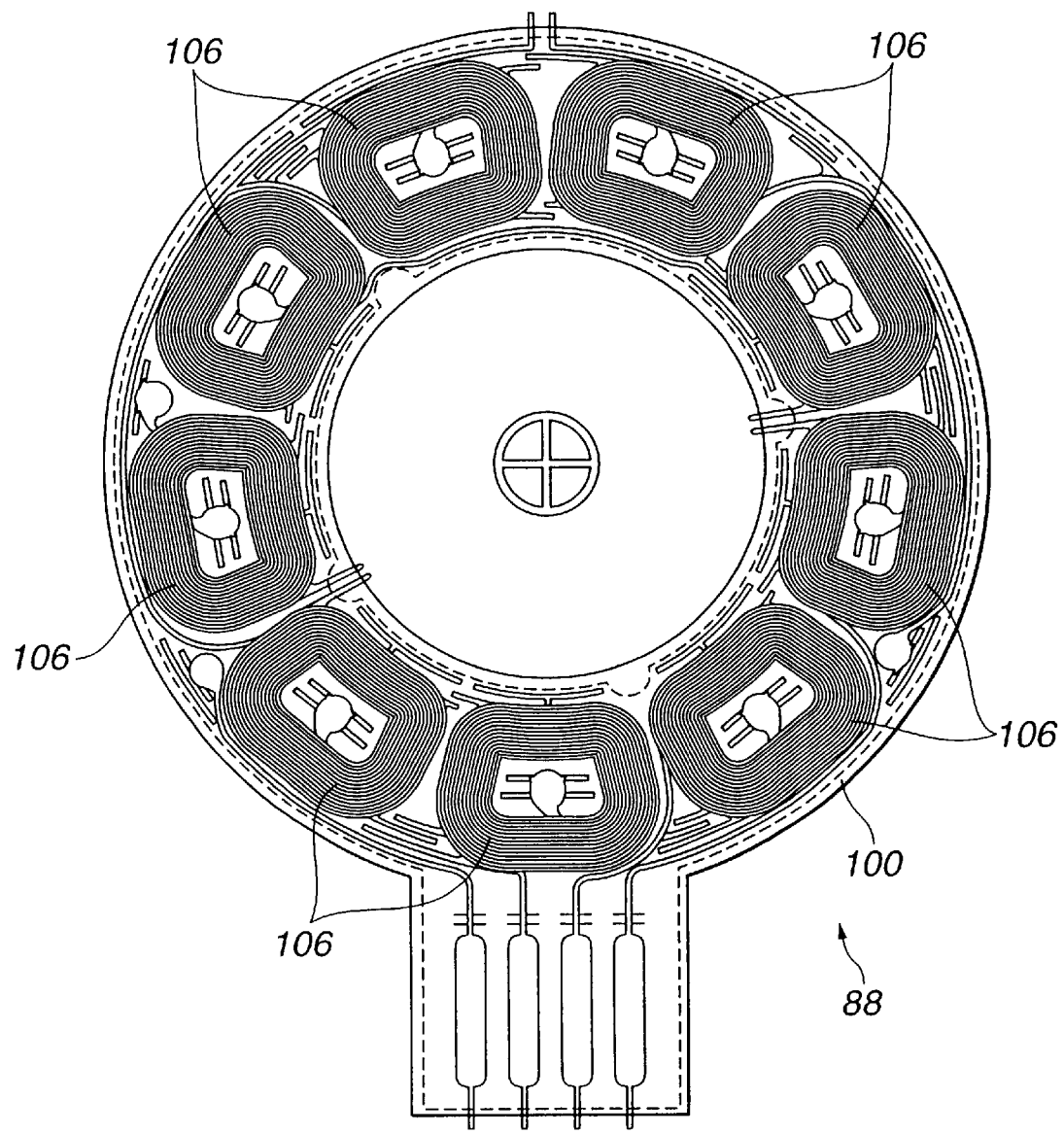
FIG. 17 is plan view depicting the winding of the stator coil.

The drive coil 88 comprises a circular section 100 and a terminal section 103. The circular section 100 has a hole 104. Winding sections 106 are provided on the circular section 100 and angularly arranged at intervals along the circumference of the section 100. FIG. 16 shows the shapes of the circular section 100 and terminal section 103 of the drive coil 88. FIG. 17 shows nine winding sections 106 arranged on the circular section 100. Each winding section 106 is composed of two layers that are laid one upon the other as is illustrated in FIGS. 19A and 19B.

As FIG. 6 shows, the drive coil 88 is formed on the stator yoke 86 and is formed integral with the stator yoke 86. A current flows in the winding sections 106 in a three-phase rectification mode.

As further shown in FIG. 6, the drive coil 88 is arranged in a face-to-face relation with the drive magnet 58 of the rotor R.

In the spindle motor 3 of the structure described herein, the rotor yokes 54 and 56 of the rotor R and the stator yoke 86 of the stator S constitute a magnetic path that serves both the drive magnet 58 and the drive coil 88.

When a current flows through the drive coil 88 in a prescribed mode, the drive coil 88 generates a magnetic field. This magnetic field interacts with the magnetic field of the drive magnet 58, rotating the rotor R and hence the shaft 60. The disc-shaped recording medium D is continuously rotated since it is secured to the projection 62 of the rotor R.

The supply of the current to the drive coil 88 is controlled by, for example, the system LSI 139 and the like that are mounted on the circuit board 37 shown in FIG. 6.

In the hard disc drive 1 shown in FIG. 6, the housing 2 contains the rotor R and the stator S. Additionally, the stator yoke 86 that is a part of the stator S constitutes a part of the second half 12 of the housing 2.

Comprising the spindle motor 3 described above, the hard disc drive of this invention is advantageous in the following respects.

The rotor R is prevented from vibrating in a plane. This is because the shaft 60 has its one end portion 66 fitted in the hole of the projection 64, thus centering the rotor R, and in the stator S, the sintered metal bearing 82, and the ball bearing 84 are coaxial around the shaft 60 and arranged in almost in the same plane in the radial direction of the motor 3.

The spindle motor 3 can be thin along the shaft 60 of the stator S (FIG. 6) for the following reasons. First, the sintered metal bearing 82 and the ball bearing 84 are arranged in almost the same plane and in the radial direction of the motor 3. Second, the drive coil 88 is mounted directly on the stator yoke 86. Third, the stator yoke 86 is a part of the second half 12 of the housing 2. Further, the drive magnet 58 that is thin and the drive coil 88 are arranged in a face-to-face relation.

In the conventional spindle motor, two ball bearings are arranged in the axial direction (the thrust direction). In the embodiment of this invention, the sintered metal bearing 82 and the ball bearing 84 are used instead. Thus, the spindle motor 3 has only one ball bearing, whereas the conventional spindle motor has two ball bearings. Having only one ball bearing used as the second bearing, the spindle motor 3 is more resistant to impacts than the conventional spindle motor. For the same reason, the spindle motor 3 can be less expensive than the conventional spindle motor. Both the first bearing and the second bearing can of course be sintered metal bearings in the spindle motor 3.

Figure 18:
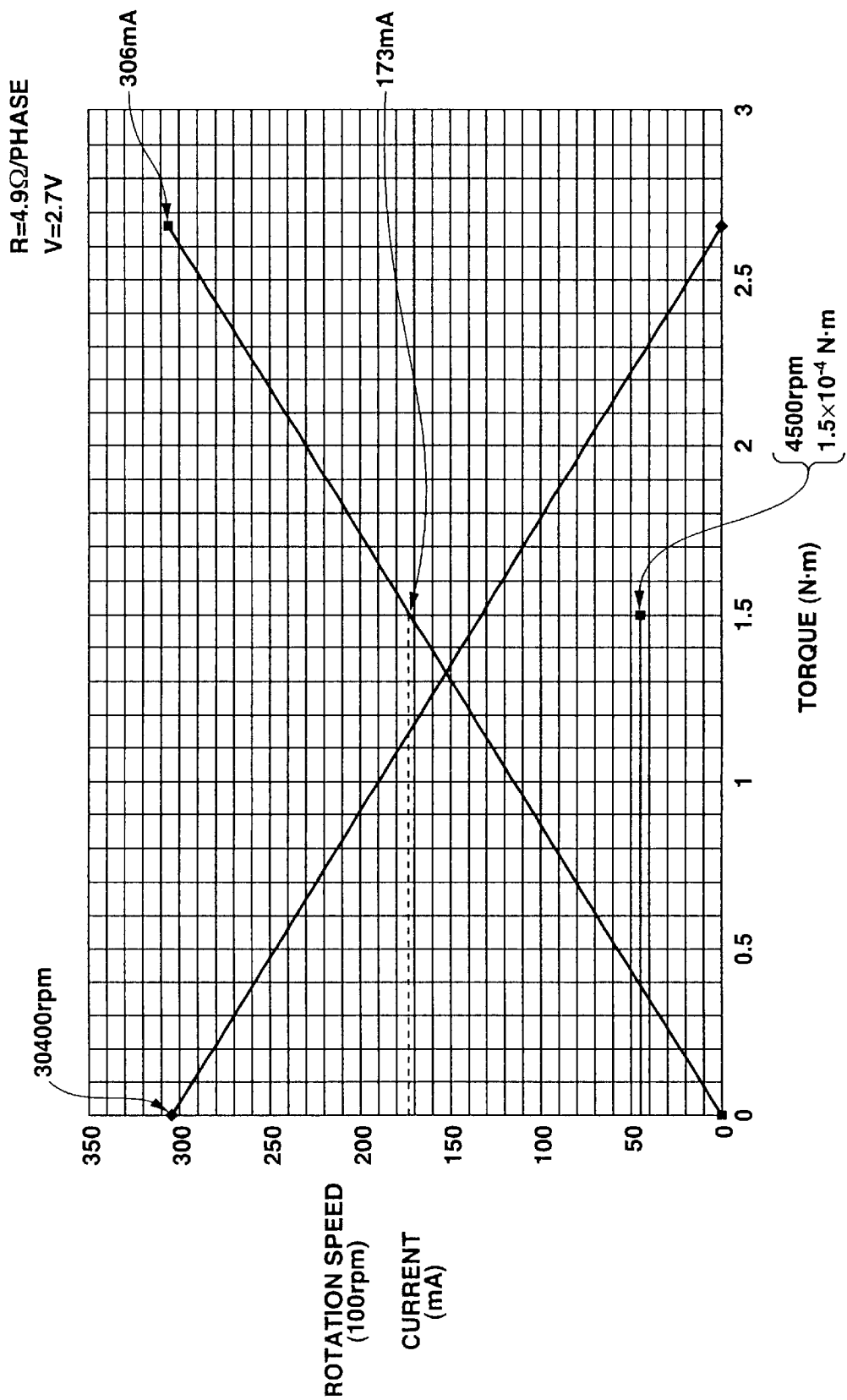
FIG. 18 is a graph representing the static characteristic of the spindle motor.

FIG. 18 represents the static characteristic of the spindle motor 3 according to the present invention. The rotation speed of the motor 3 and the current supplied thereto are plotted on the ordinate, and the torque of the motor 3 is plotted on the abscissa.

The static characteristic of FIG. 18 is the result of the test that was conducted to determine whether the spindle motor can rotate at a target speed of 450 rpm to achieve a torque of $1.5 \times 10^{-4}$.Em (1.5 g.cm) when the thin laminate coil is driven in three-phase, full-wave excitation mode.

Figure 21A:
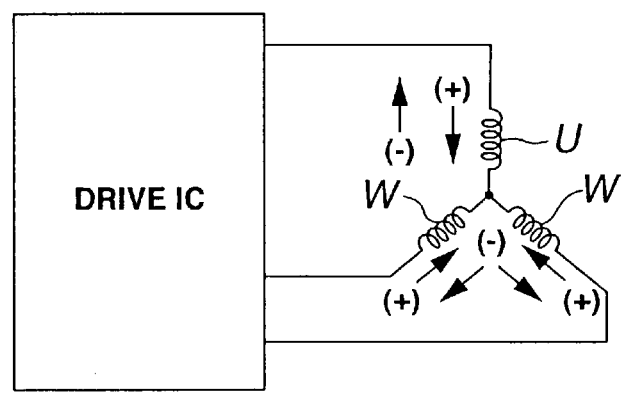
FIG. 21A is a circuit diagram of a three-phase, full-wave excitation circuit incorporated in the spindle motor.
Figure 21B:
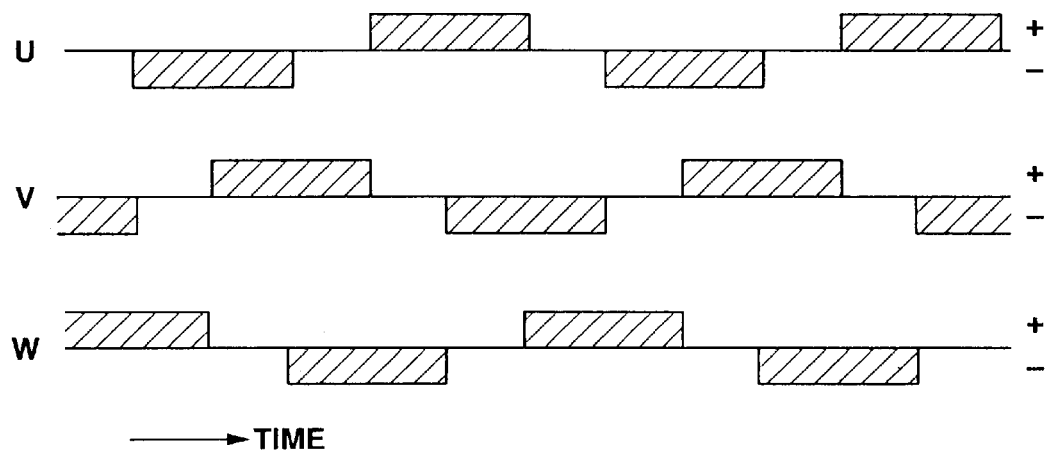
FIG. 21B is a timing chart showing the mode of exciting the windings of the spindle motor.

FIGS. 19A and 19B are diagrams illustrating the current-flow modes in the drive coil 88. More correctly, they show the modes in which a current may flow in the winding sections 106 of the drive coil 88. Each winding section 106 is composed of three phase windings, i.e., U-phase coil, V-phase coil and W-phase coil. A three-phase, full-wave excitation circuit supplies a current to each winding section 106. As illustrated in FIG. 21A, the three-phase, full-wave excitation circuit comprises a drive IC (Integrated Circuit) 900, which is connected to the U-phase coil 910, V-phase coil 920 and W-phase coil 930. FIG. 21B represents the mode of exciting the U-phase coil, V-phase coil and W-phase coil of the spindle motor 3.

Figure 20:
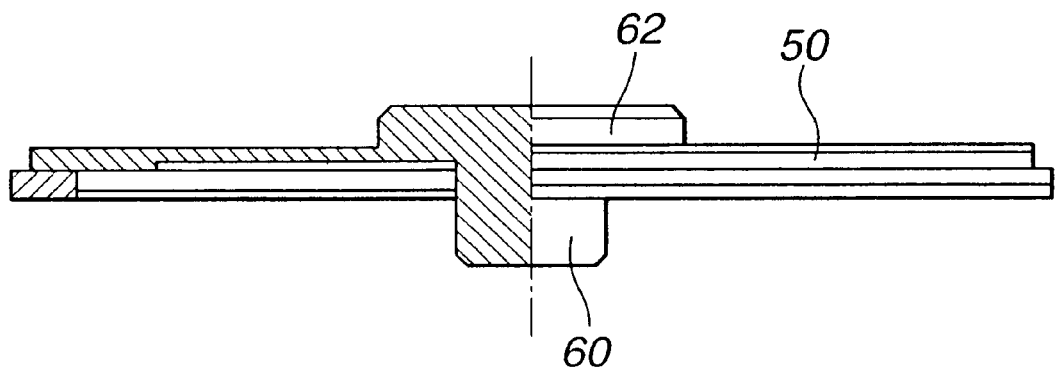
FIG. 20 is a partly sectional view of a modification of the rotor, wherein the shaft formed integral with the rotor housing.

FIG. 20 shows a modification of the rotor R of the spindle motor 3 shown in FIG. 6. In the rotor R of FIG. 6, the shaft 60 has one end portion 66 press-fitted in the projection 62.

By contrast, in the modified rotor of FIG. 20, the shaft 60 is formed integral with the projection 62 of the rotor housing 50.

The present invention is not limited to the embodiments described above. In the embodiments, the spindle motor is incorporated in the hard disc drive, i.e., a data recording/reproducing apparatus according to this invention. Nonetheless, the present invention may be applied to an optical disc drive, a magneto-optical disc drive, an apparatus for reproducing data from optical discs, or the like, too.

Furthermore, the ball bearing 84 shown in FIG. 6 and functioning as the second bearing may be replaced by any other type of a bearing.

What is claimed is:

1. A spindle motor having a rotor and a stator for rotating the rotor, said rotor comprising:
   a shaft;
   a rotor housing formed integral with the shaft and configured to hold an object to be rotated;
   a rotor yoke formed integral with the rotor housing and made of magnetically permeable material; and
   a drive magnet secured to the rotor yoke, and
   said stator comprising:
   a stator housing;
   a first bearing held in the stator housing and supporting the shaft, allowing the shaft to rotate;
   a second bearing provided between the stator housing and the rotor housing, arranged concentric to the first bearing in a radial direction, and supporting the rotor, allowing the rotor to rotate;
   a stator yoke formed integral with the stator housing, constituting a part of a housing containing the rotor and the stator, and made of magnetically permeable material; and
   a drive coil mounted on the stator yoke and arranged in face-to-face relation with the drive magnet, wherein:
   the first bearing is a sintered metal bearing, and the second bearing is a ball bearing, and
   the sintered metal bearing is a dynamic-pressure fluid bearing.

2. The spindle motor according to claim 1, wherein the stator yoke is a silicon steel plate or an iron plate, and the drive coil is formed integral with an inner surface of the stator yoke.

3. A data recording/reproducing apparatus that comprises a spindle motor having a rotor and a stator for rotating the rotor, said rotor comprising:
   a shaft;
   a rotor housing formed integral with the shaft and configured to hold a disc-shaped recording medium to be rotated;
   a rotor yoke formed integral with the rotor housing and made of magnetically permeable material; and
   a drive magnet secured to the rotor yoke, and
   said stator comprising:
   a stator housing;
   a first bearing held in the stator housing and supporting the shaft, allowing the shaft to rotate;
   a second bearing provided between the stator housing and the rotor housing, arranged concentric to the first bearing in a radial direction, and supporting the rotor, allowing the rotor to rotate;
   a stator yoke formed integral with the stator housing, constituting a part of a housing containing the rotor and the stator, and made of magnetically permeable material; and
   a drive coil mounted on the stator yoke and arranged in face-to-face relation with the drive magnet, wherein:
   the first bearing is a sintered metal bearing, and the second bearing is a ball bearing, and
   the sintered metal bearing is a dynamic-pressure fluid bearing.

4. The data recording/reproducing apparatus according to claim 3, wherein the stator yoke is a silicon steel plate or an iron plate, and the drive coil is formed integral with an inner surface of the stator yoke.

* * * * *

UNITED STATES PATENT AND TRADEMARK OFFICE
CERTIFICATE OF CORRECTION

PATENT NO.   : 6,801,388 B2
DATED        : October 5, 2004
INVENTOR(S)  : Shun Kayama et al.

It is certified that error appears in the above-identified patent and that said Letters Patent is hereby corrected as shown below:

Title page,
Item [54], Title, replace "SPINDLE MOTOR AND DATA RECORDING/ REPRODUCTING APPARATUS WITH DYNAMIC-PRESSURE FLUID BEARING SUPPORTING SHAFT AND BALL BEARING SUPPORT ROTOR" with -- SPINDLE MOTOR AND DATA RECORDING/REPRODUCING APPARATUS WITH DYNAMIC-PRESSURE FLUID BEARING SUPPORTING SHAFT AND BALL BEARING SUPPORTING ROTOR --.

Signed and Sealed this

Nineteenth Day of April, 2005

JON W. DUDAS
*Director of the United States Patent and Trademark Office*